United States Patent [19]

Ryder

[11] 4,070,141
[45] Jan. 24, 1978

[54] APPARATUS FOR INJECTION BLOW MOLDING

[76] Inventor: Leonard Benoit Ryder, 5 Sharon Drive, Whippany, N.J. 07981

[21] Appl. No.: 744,951

[22] Filed: Nov. 26, 1976

[51] Int. Cl.² .............................................. B29D 23/03
[52] U.S. Cl. ................................................... 425/535
[58] Field of Search ........... 425/DIG. 204, DIG. 208, 425/DIG. 209, 526, 535, 468; 264/94

[56] References Cited

U.S. PATENT DOCUMENTS

| | | | |
|---|---|---|---|
| 3,116,877 | 1/1964 | Moslo | 425/387 B |
| 3,937,610 | 2/1976 | Farrell | 425/387 B |

Primary Examiner—Richard B. Lazarus
Attorney, Agent, or Firm—Edward M. Fink

[57] ABSTRACT

A novel procedure for circulating blowing air through an injection blow molded article during the blow cooling cycle of an injection molding process is described. The technique involves the use of a new core rod assembly which permits internal circulation of cool air during the blow cooling cycle of the process. The described assembly may also be used for reconditioning itself by the use of heated air, so avoiding the phenomenon of core rod freeze-up.

2 Claims, 5 Drawing Figures

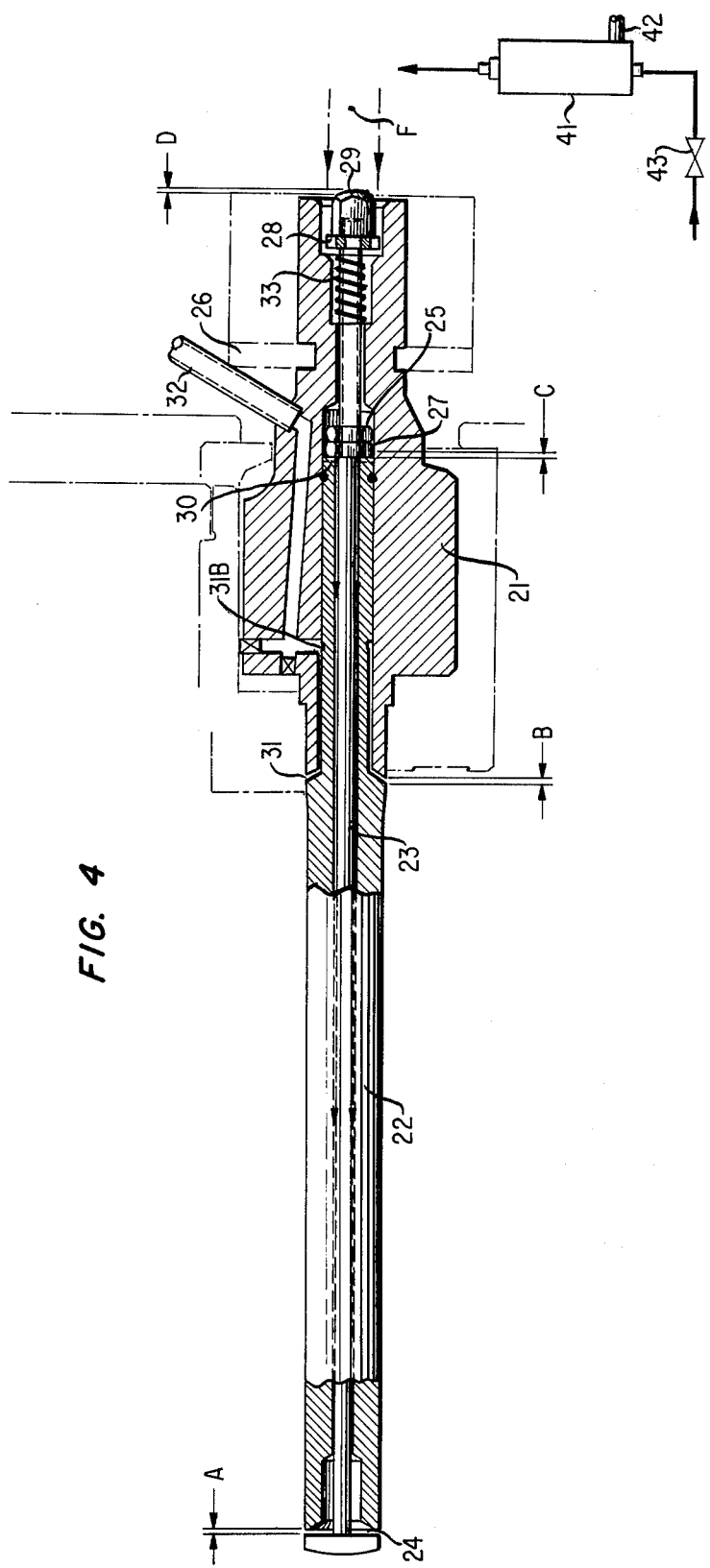

APPARATUS FOR INJECTION BLOW MOLDING

This invention relates to the molding of plastics. More particularly, the present invention relates to a method and apparatus for injection blow molding of hollow plastic articles such as containers comprised of thermoplastic material.

In conventional techniques for fabricating injection blow molded articles, a blow molding machine including an injection mold station, a blowing station and a stripping station is employed. These three stations are located around a core rod support which is connected to each station. During operation, plastic is injected into a mold at the injection station and coats the core rod with a parison which is next carried to the blowing station. There air is applied through the core rod to expand the parison. Prior to moving the blown article, it must be cooled and heretofore this end has usually been attained by cooling externally with water in the molds. Unfortunately, internal cooling of the blown article has been difficult to implement due to the fact that practical and economical methods have not been available for cycling either chilled or unchilled air through the blown article during the blow cooling cycle. Attempts to obviate this limitation have involved the use of extremely cold air, typically having a temperature of −55° F, as the blowing media. Studies have revealed that whether the cold blowing air is trapped in the blown article or cycled through it, the air tends to overchill the metal surfaces of the core rod tip and the head of the injection blow molding apparatus, so resulting in a phenomenon commonly referred to as "core rod freeze up". Under such circumstances, when hot plastic is injected into the preform injection mold a poor quality parison results due to disruption of the flow of hot plastic over the excessively cold core rod tip and head. Consequently, workers in the art have never succeeded in effectively cooling blown articles by internal cooling means. Additionally, suitable means for conditioning core rods, that is reheating to temperatures suitable for injection of preforms, have not been available for use in conjunction with small bottles.

In accordance with the present invention, these prior art limitations are effectively obviated by means of a novel technique and apparatus for circulating blowing air through an injection blow molded article during the blow cooling cycle of the injection molding process utilizing bottom blowing and top exhausting or top blowing and bottom exhausting. The core rod freeze up phenomenon is successfully avoided herein by circulating hot air through the passage previously employed for circulation of the cooling media through the core rod at the ejection or stripping station in the molding process, thereby reheating the metal core rod and tip to the desired operating levels prior to indexing to the preform injection step.

The invention will be more readily understood by reference to the accompanying drawing wherein:

FIG. 4 is a front elevational view of the apparatus of FIG. 2 together with means for reconditioning the core rod head and tip in accordance with the invention.

Figure 1:
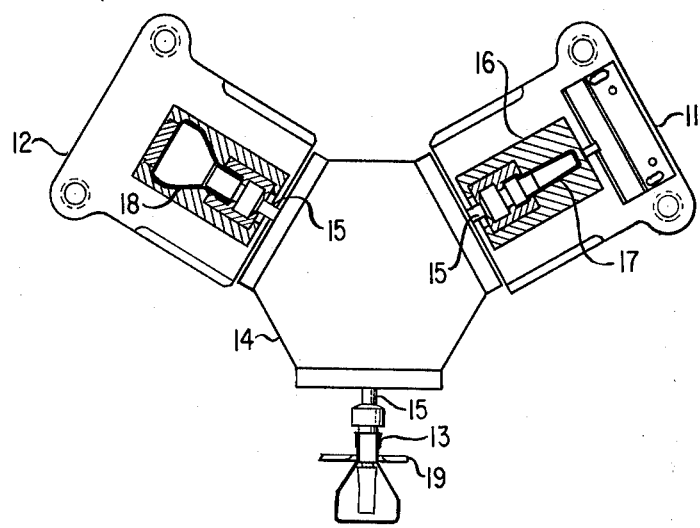
FIG. 1 is a schematic representation of a typical three station injection blow molding apparatus including the novel core rod of the invention.

With reference now more particularly to FIG. 1 there is shown a typical three stage injection blow molding apparatus in accordance with the invention. Shown in this Figure is an injection or preform mold station 11, a blow mold station 12 and a stripper or injector station 13, each of which are disposed at equal angular spacings of 120° C around a core rod support for indexing table 14. Extending from each of the foregoing stations is a core rod assembly 15 in accordance with the invention.

For purposes of exposition, a brief description of the injection molding process will be given. A suitable plastic composition is initially injected into a preform mold 16 in preform mold station 11 to coat the core rod with a parison 17. When the mold is opened, indexing table 14 rotates 120° to carry parison 17 with the core rod to blowing station 12. The mold 18 includes a cavity which is shaped in the form of the article to be blown. Following air under pressure is circulated through core rod 15 at blowing station 12 to expand the parison on the core rod so as to contact the walls of the blow mold cavity. Then, a cooling medium is circulated through the blown article by means of the novel core rod assembly in order to facilitate removal of the blown article from the blow mold. Finally, the blown article is indexed to ejection or stripping station 13 where it is stripped from core rod 15 by ejector plate 19.

Figure 3A:
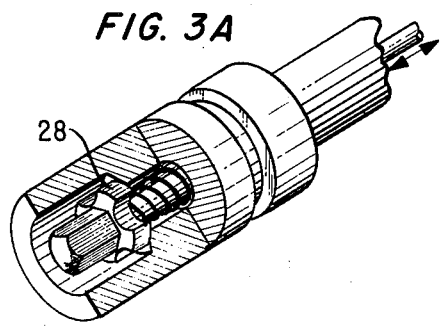
FIG. 3A is an enlarged view, cut away, of a star locking nut of the core rod assembly of FIG. 2.
Figure 3B:
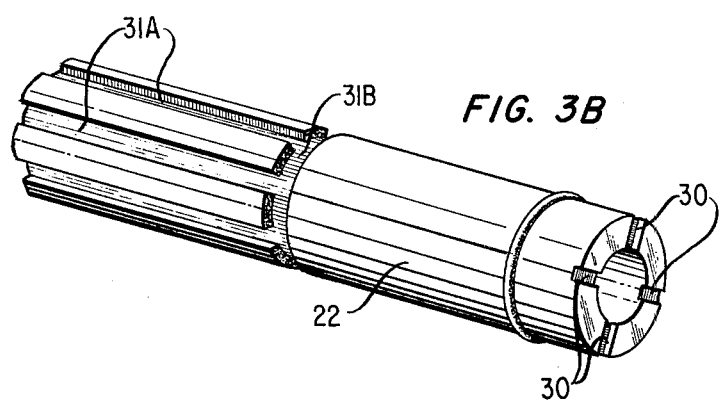
FIG. 3B is an end view in perspective of the back end of the core rod head of FIG. 2 showing the air passage slots.
Figure 2:
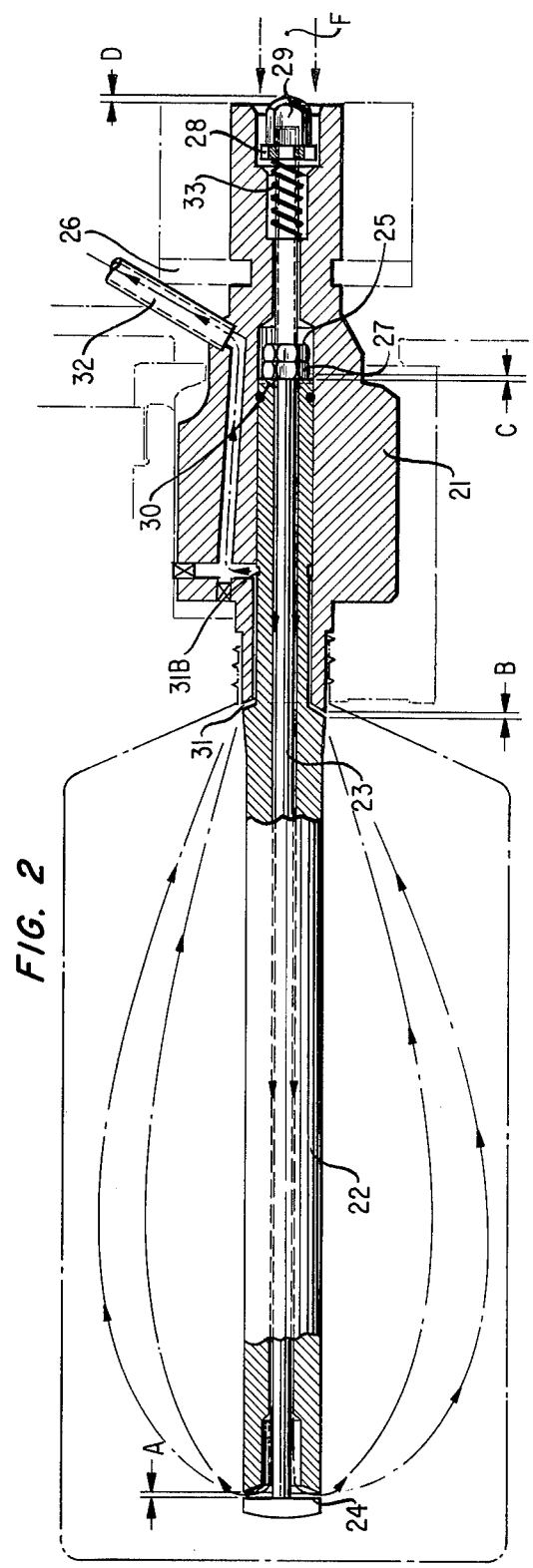
FIG. 2 is a front elevational view in cross section of a typical blow core rod assembly in accordance with the invention.

FIG. 2 is a cross-sectional view of novel core rod assembly 15 which includes a core rod body 21 having a hollow axially slideable core rod head 22 mounted therein, and a core rod stem 23 having a core rod tip 24 mounted within hollow core rod head 22. Head 22 is mounted in the shank area of core rod body 21 which is inserted in face block 25 and held in place by retaining plate 26. Core rod stem 23 is fitted with adjustable locking nuts 27 and adapted with star locking nut 28 and cam nut 29. A source of cool air (not shown) is introduced to the core rod assembly through grooves in the star locking nut assembly 28 (FIG. 3A) and passes through air passage slots 30 (shown in cut away view in FIG. 3B) machined into the end of core rod head 22. Also shown is air exhaust passage 31 leading to air exhaust slots 31A and air exhaust ring channel 31B which communicates with air exhaust conduit 32. The star locking nut assembly also includes a spring 33 which permits movement of the core rod stem when activated by the trigger bar assembly located in conventional indexing heads of the type depicted in FIG. 1. Upon actuation, the adjusting nuts 27 are locked in a position such that as the core rod stem 23 moves activated core rod head 22 moves outward, so creating a channel through which air can be passed through a blown article.

A brief description of the operation of the described apparatus will assure a fuller understanding of the inventive concept.

In operation, core rod head 22, in its neutral position, is indexed to the injection station or preform mold station 11 of the apparatus shown in FIG. 1 where the preform injection mold halves close over it and hot plastic is injected into the preform cavity to form the desired plastic preform. For convenience, the neutral position of the core rod assembly may be defined as the position in which the core rod stem and tip as well as the core rod head have been positioned in an air closed posture by viture of the spring compression which is established when the trigger bar on the indexing transfer head of FIG. 1 is disengaged and no longer pushes against cam nut 29. Thus, upon disengagement, the spring 33 expands and pushes star locking nut 28 and cam nut 29 outward to the air closed position. Since these locking nuts are locked to core rod stem 23, the core rod stem also assumes a neutral position, forcing core rod head 22 to do likewise, thereby closing air inlet and outlet passages which are formed naturally between the core rod tip and head and the core rod head and body. Sealing of these air ports also permits hot plastic to be injected over the core rod without the plastic closing off the air passages.

Following injection of hot plastic over the core rod head and tip and into the preform cavity to yield a desired preform, cooling of the preform is effected. Then, the injection mold halves are opened and the core rod assembly, with the preform in place on the core rod, is indexed to the blow mold station by the indexing transfer head of the apparatus of FIG. 1.

Upon coming to rest in the blow molding station, the blow mold halves close over the preform. In a typical case, a bottle preform having a threaded neck section is employed. Upon closure of the mold halves, contact is made with the preform's threaded neck station, the remainder of the preform being suspended in air inside the blow mold. Next, the trigger bar in the indexing transfer head moves outward and engages cam nut 29, causing it to move outward. The cam nut, which is threaded and locked to core rod stem 23 pushes the stem forward, so opening the blow air inlet passage A in FIG. 2, in the space formed between the core rod tip 24 and the core rod head 22. The cam nut and core rod stem continues to push outward from their neutral position until the adjustable locking nuts 27 meet with and push against the back end of core rod head 22, so causing it to move outward from its neutral position. This outward travel of the core rod head is controlled so as to provide a sufficient air passage space B in FIG. 2 between the core rod head and the core rod body. This permits suitable blow air exhaust. However, it should be noted that care is exercised to avoid excessive outward movement of the core rod so that core rod tip air passage A will not be closed or sealed off. Thus, in a typical adjustment, if a 30 mil air passage spacing is desired at the core rod tip, A, and a 30 mil air exhaust passage spacing between the core rod head and body B the spacing for air open position, designated "D", is adjusted to provide a 60 mil total travel of the core rod stem from its neutral position to its outermost position while the C spacing is adjusted to provide a 30 mil travel distance of the core rod stem before the adjusting nuts meet and push outward against the back of the core rod head. Adjustment of the "D" spacing is effected by proper positioning of the cam nut and star locking nut in the core rod stem. Adjustment of the "C" spacing is made by proper positioning of the adjustment locking nuts in the core rod stem. The sequence in a 60 mil travel would therefore be as follows: The trigger for the indexing transfer station would advance and engage the cam nut pushing it and the core rod stem forward 30 mils until the adjustable locking nuts meet and engage the back end of the core rod head. At this juncture, a 30 mil air inlet passage arises at A but there is no outlet exhaust air spacing at B. The core rod stem and adjustable locking nuts continue their outward travel for an additional 30 mils by the action of the trigger bar, the core rod head being pushed outward. At the end of this additional 30 mils of travel, a 30 mil air exhaust passage is formed at B and the 30 mil inlet air passage is retained at A, the cam nut and core rod stem having travelled outward a total distance of 60 mils.

At this time, compressed air conduit means in the indexing head registers with and engages with inlet air port F (FIG. 2) which is an integral part of the back end of the core rod body. The blow air timer then opens a blow air solenoid valve and cold compressed air passes through the air passages inside the core rod head, shown by solid arrows in FIG. 2, and exits at air passage A. This cold compressed air blows the hot plastic preform off the core rod head and tip, outwardly until it conforms to the shape of the mold (a cylindrical bottle in FIG. 2). Then, the blown hot plastic article is cooled externally by the metal walls of the cold mold. The internal surfaces of the blown plastic article are then cooled by sweeping of cold blown air thereover, the air being exhausted through air passage B and blow air exhaust conduit 32. An adjustable pressure reducing valve may be placed in the blow air exhaust line and set at a pressure slightly below that of the desired inlet blow air pressure so that a suitable volume of air will be swept through the blown article during the blow cooling period. The cool blowing air employed for this purpose may be sub-zero temperature dry air or a mixture thereof with water vapor to yield a cold air water mist.

This internal sweeping of the blown plastic article will result in accelerated cooling of the blown article, so accelerating production rate. Practical considerations preclude installation of an automatic air brush in the core rod head, thereby necessitating mixture of the water and cold dry air phases outside the blown article before being introduced into and through the air supply port.

This end may therefore the attained by the use of a single atomizing assembly such as that employed for paint spraying with water being employed as the fluid phase. In order to avoid difficulties associated with premature freezing of the water mist phase in the core rod head passages smaller volumes of water are employed in the cooling mixture than are used in extrusion blow molding, as described in the aforementioned copending case.

At the termination of the blow cooling cycle, the blow air supply value is closed and the air conduit means disengaged from the blown air supply port, thereby effecting complete exhaustion of air from inside the blown article and depressurizing it.

Next, the blow mold halves are opened and the core rod head containing the blown article is indexed to the stripping section. The stripping or ejection bar removes the blown article and reconditioning of the core rod head and tips is initiated.

For purposes of exposition, this end shall be described in terms of the use of a flameless electric torch. However, it will be understood by those skilled in the art that other means may also be used such as hot oil, superheated steam and the like. It will also be understood that reconditioning may be effected by any additional stages interposed between stripping and injection status.

With reference now to FIG. 4, there is shown the core rod head and tip of FIG. 2 together with means 41, a flameless electric torch actuated by power control module 42 and connected with a source of plant compressed air (not shown) by means of blow air supply valve 43. In operation, a timer actuates power to heat the resistance elements contained within torch 41 to the desired temperature. Blow air supply valve 43 is then opened and air under compression is passed through and heated by the flameless torch to temperature ranging up to 1600° F. The heated air is then passed into the core rod head and follows the same path as that followed by the cold blowing air described above. Thus, the hot air reheats and conditions the core rod head and tip so that their temperature is satisfactory for injection of hot plastic over the core rod head and tip after indexing to the injection station. The cycle may then be repeated.

It will be understood by those skilled in the art that the instant invention has been described in terms of the use of a bottom blow core rod. However, a top blow core rod may also be used, the direction of blowing air flow being reversed from that shown in the bottom blow method. This end is attained by means of solenoid valves in each of the external air passage lines connected to the blown article and air exhaust and supply lines interconnections to the solenoid valves.

What is claimed is:

1. Core rod assembly for circulating blowing air through an injection blow molded article including an elongated core rod body having an axis and a hollow axially slideable core rod head mounted therein, the core rod head having air passage slots machined into the end thereof, and a core rod stem having a core rod tip mounted within said core rod head, the core rod stem being fitted with adjustable locking nuts, a star locking nut having grooves machined therein which permit air to pass from an air source into the core rod body then through the air passage slots in said core rod head into a space between said stem and head, and a cam nut, each of which nuts permit limited axial movement of said core rod stem, a spring member which biases said core rod stem in a direction along said axis, and means for moving said core rod stem and core rod head with respect to said core rod body such that said adjustable locking nuts are locked in a position whereby said core rod stem has moved the core rod tip to a position spaced from said core rod head and a portion of the core rod head previously in abutment with the core rod body is now spaced from the core rod body thereby creating an air supply channel between the core rod tip and the core rod head and an air exhaust channel between the core rod body and said portion of the core rod head so that air can be passed to and exhausted from a blown article simultaneously.

2. Assembly in accordance with claim 1 wherein the core rod head is mounted in a shank area of said core rod body.

* * * * *